April 30, 1963  T. A. SCANLON  3,088,051
LIGHT SENSITIVE UNIT
Filed Aug. 22, 1960

INVENTOR.
THOMAS A. SCANLON
BY
*William Frederick Werner*
ATTORNEY

United States Patent Office 3,088,051
Patented Apr. 30, 1963

1

3,088,051
LIGHT SENSITIVE UNIT
Thomas Aloysius Scanlon, 40 Hawthorne Ave.,
Barrington, R.I.
Filed Aug. 22, 1960, Ser. No. 51,082
2 Claims. (Cl. 315—77)

This invention relates to control circuits and more particularly to a unit containing a circuit for automatically turning on automobile lights at a predetermined level of visibility.

One of the important factors to be considered when driving a car is that the driver's car be visible to others so that maneuvers made in ignorance by others will not occur and perhaps foment an accident. This is particularly important when a driver has the impression that his view through the windshield is fairly good, without realizing that his view to the rear, particularly with the aid of a rear view mirror is not good at all. This particular condition arises during certain poor visibility periods such as dusk, or when fog or a rainstorm occurs. At such times a driver will often forget that his car may not be too clearly visible so long as he believes that he can see fairly well what is before him. It is at this time that it becomes particularly desirable to have the parking lights of a car turned on so that others may be aware of its presence.

It is therefore an object of my invention to provide an improved circuit for automatically turning on automobile parking lights when the outside visibility is lowered to a predetermined level.

A further object of my invention is to provide a sensitive photoelectric circuit which is responsive to a desired low visibility level to automatically turn on automobile parking lights.

Another object of my invention is to provide such a photoelectric circuit which is operable directly from a low voltage direct current source.

Other objects will become apparent from a perusal of the accompanying specification and drawing in which.

Figure 1:
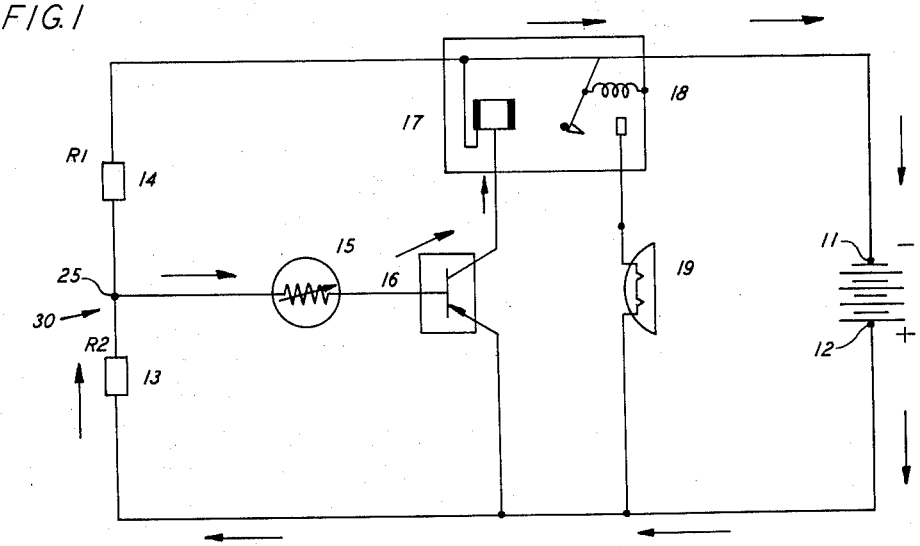
FIGURE 1 is a schematic view of the circuit at a time of good clear visibility.

Looking with greater particularity at the drawing it is seen that 11 and 12 are terminals fastened to a D.C. source, preferably an automobile battery with terminal 11 on the negative side and terminal 12 on the positive side. In this illustrative case the source is designated as a 12 volt battery. A voltage limiting circuit 30 is connected across the battery terminals 11 and 12 and comprises a resistor 13 in series with a solid-state photocell 15, preferably a cadmium selenide photocell, which in turn is connected to the base of a suitable transistor 16. The collector of this transistor is connected to a relay 17 which when actuated opens a normally closed switch 18. The switch 18, with the lights 19 of the automobile, in series, are both connected across the D.C. source.

To control the flow of the plate current and provide the desired results a resistor is connected between a point just after relay 17 and a point 25 intermediate resistor 13 and photocell 15. The transistor emitter is connected to the positive side of the circuit before the resistor 13.

2

With reference to the drawing the following explanation is simplified. The photocell 15, preferably a Ferroxcube LDR Tyee B8.731.03 Cadmium Selenide photocell, is one whose resistance varies, increasing as the light decreases. Considering FIGURE 1 when visibility is good and assuming that current flow is from positive to negative as indicated by the arrows in the drawing it is seen that the current will flow from the positive terminal 12 through resistor 13 which in this preferred embodiment is rated at 3300 ohms and ½ watt. Properly selected as previously described, photocell 15 will have a lower resistance than resistor 14 when visibility is good and a higher resistance than resistor 14 at a desired low level of visibility. In this particular case resistor 14 has been selected with a rating of 10,000 ohm and ½ watt. At this point 25 the current will flow through the photocell and thus permit the transistor 16 to transmit the current to the relay 17 which in turn opens switch 18. In this case the transistor is a GT20 P-N-P type transistor and the relay and switch selected is a Sigma No. 11F (normally closed). From the relay and switch the current returns to the negative terminal.

Figure 2:
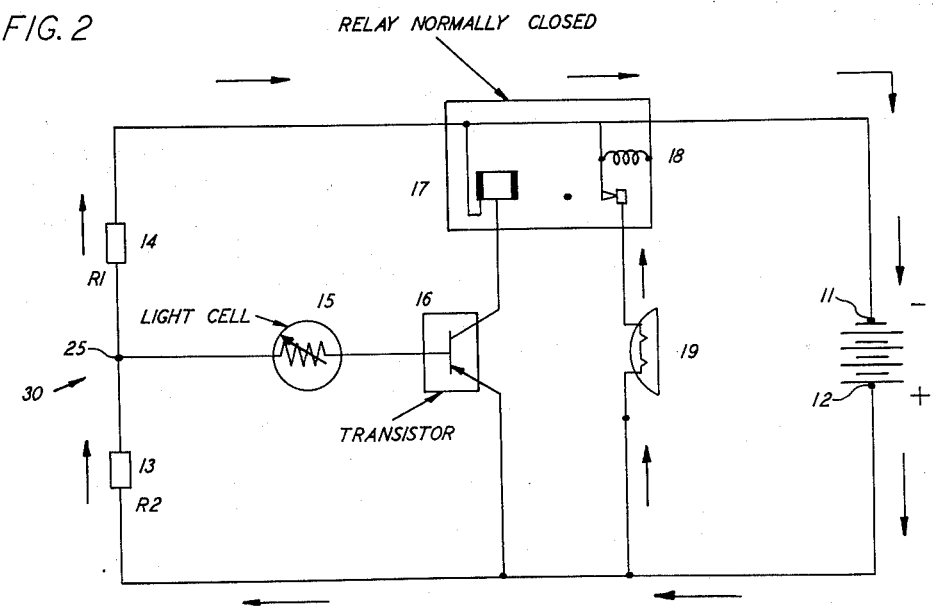
FIGURE 2 is a schematic view of the circuit during the daytime when visibility is poor.

In contrast to the above described proceedings which take place during good light the following takes place when poor visibility occurs:

Looking at FIGURE 2 it is seen that the current departs from the positive terminal 12 and passes through the resistor 13. Because of the poor light photocell 15 has now increased its resistance so that it now exceeds that of resistor 14. Therefore from point 25 the current proceeds through resistor 14 and returns to the negative terminal 11 without disturbing the relay 17. Since switch 18 therefore remains undisturbed from its normally closed position, current will also flow through the automobile lights 19 (preferably parking lights) shown here as a single light, in parallel with the resistors and thus bring about the desired illumination.

Having shown and described a preferred embodiment of the present invention, by way of example, it should be realized that structural changes could be made and other examples given without departing from either the spirit or scope of this invention.

What I claim is:

1. Apparatus for automatically energizing an electrical circuit in response to a predetermined drop in ambient lighting, comprising: a source of D.C. voltage; a circuit to be energized connected across said source and including a normally closed electrically controlled switch; and means energized by said source for opening said switch including a transistor having a base, emitter and collector, and a solenoid operatively connected to said switch, said solenoid and the emitter and collector of said transistor being connected in series across said source, a resistive voltage divider network also connected across said source and a light sensitive resistor connected between a point on said voltage divider network and the base of said transistor whereby in response to a predetermined lowered level of ambient light, said transistor is forwardly biased to energize said solenoid and hold said switch in open position.

2. Apparatus for automatically lighting the headlights of an automobile in response to a predetermined level of ambient illumination, comprising a source of D.C. voltage; a pair of incandescent lamps; means including a pair of normally closed contacts connecting said lamps across said voltage source; a solenoid, operative when energized to open said contacts; a transistor including a base, emitter and collector; the emitter being connected to the positive side of said source and the collector being connected to the negative side of said source through said solenoid; and a biasing network for said transistor including a light sensitive device and two resistors for dividing said D.C. voltage, a first resistor connected in series between the base and emitter and a second resistor connected between the junction of said light sensitive device and said first resistor and the negative side of said source, the resistance of said light sensitive device being less than that of said second resistor at a predetermined level of ambient illumination, whereby in response to a predetermined lowered level of ambient light, said transistor is forwardly biased to energize said solenoid and hold said switch in open position and thus turn on said headlights.

References Cited in the file of this patent
UNITED STATES PATENTS

| | | |
|---|---|---|
| 1,981,985 | Braselton | Nov. 27, 1934 |
| 2,831,981 | Watts | Apr. 22, 1958 |
| 2,888,611 | Matkins | May 26, 1959 |

OTHER REFERENCES

Radio and Television News Mag., August 1955 (pages 56–57), Transistorized Headlight Dimmer by P. Penfield, Jr.